Jan. 25, 1944.   J. G. VINCENT   2,339,967
MOTOR VEHICLE
Filed Aug. 26, 1939   7 Sheets-Sheet 1
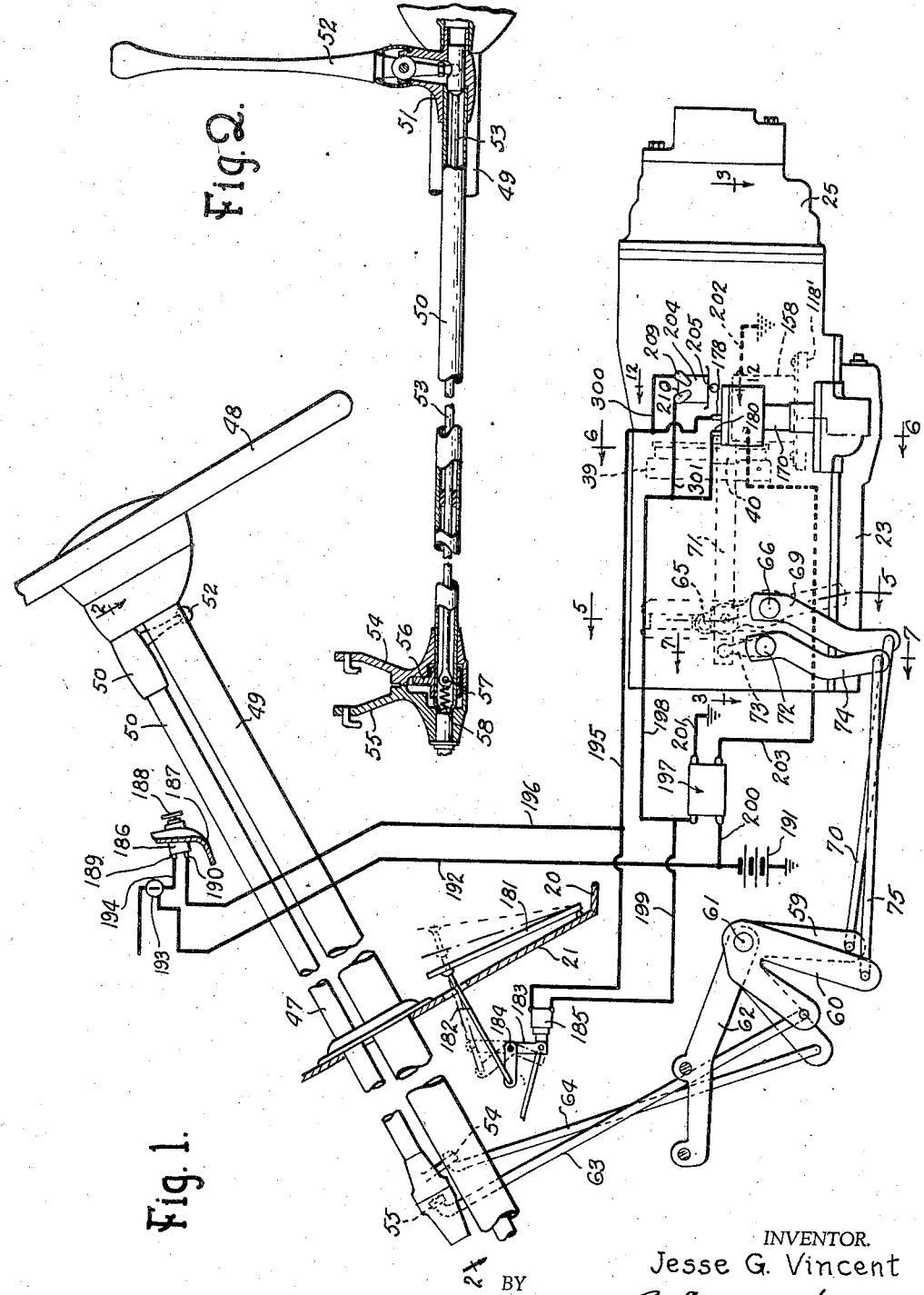
INVENTOR.
Jesse G. Vincent
BY
Tibbetts & Hart
ATTORNEYS

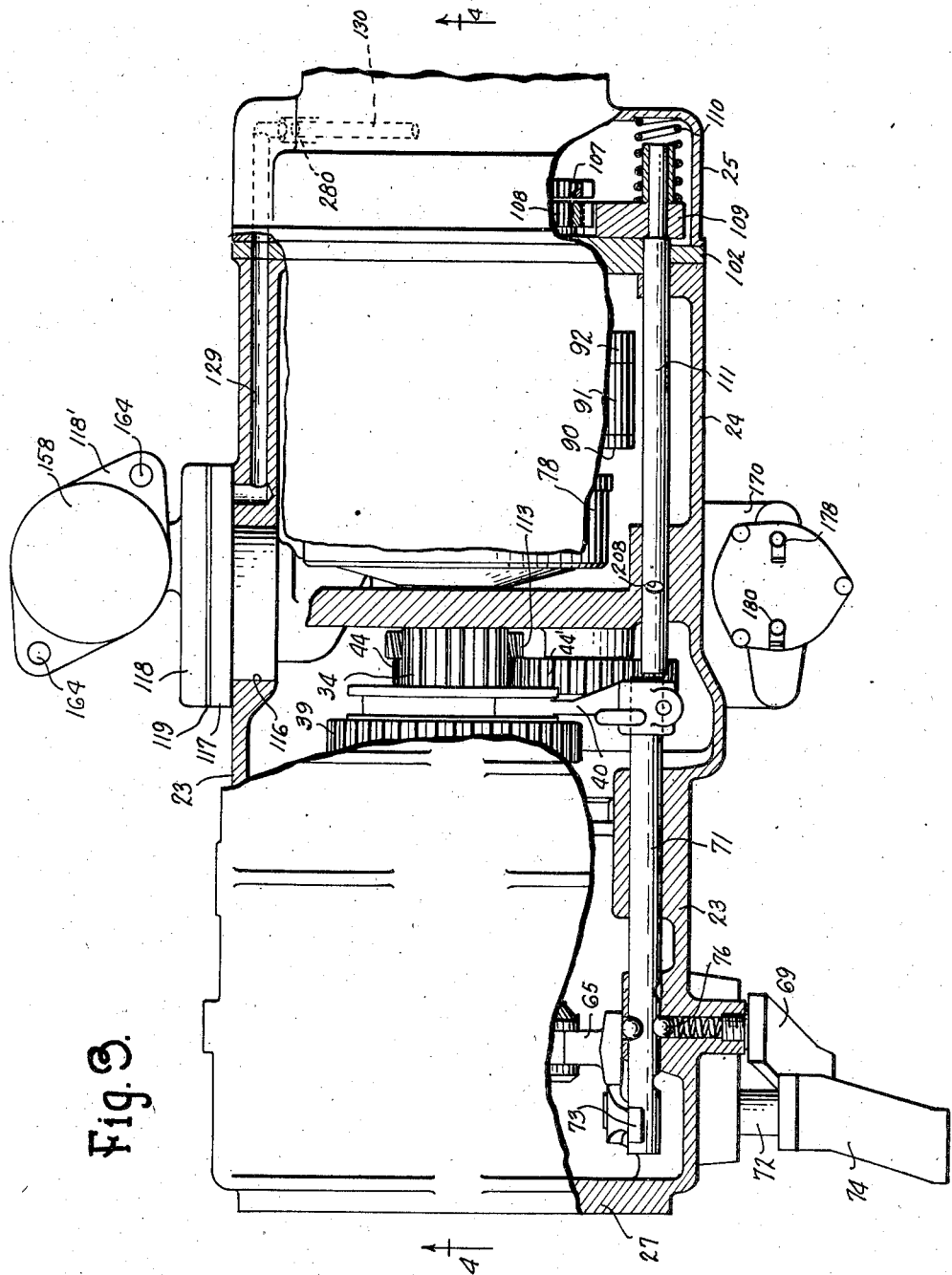

Jan. 25, 1944.　　　J. G. VINCENT　　　2,339,967
MOTOR VEHICLE
Filed Aug. 26, 1939　　　7 Sheets-Sheet 3
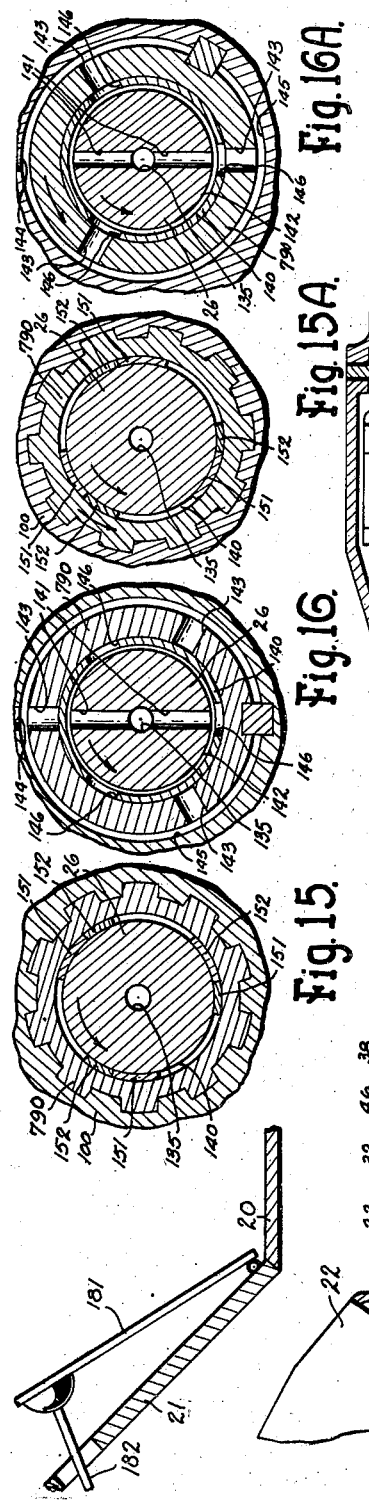
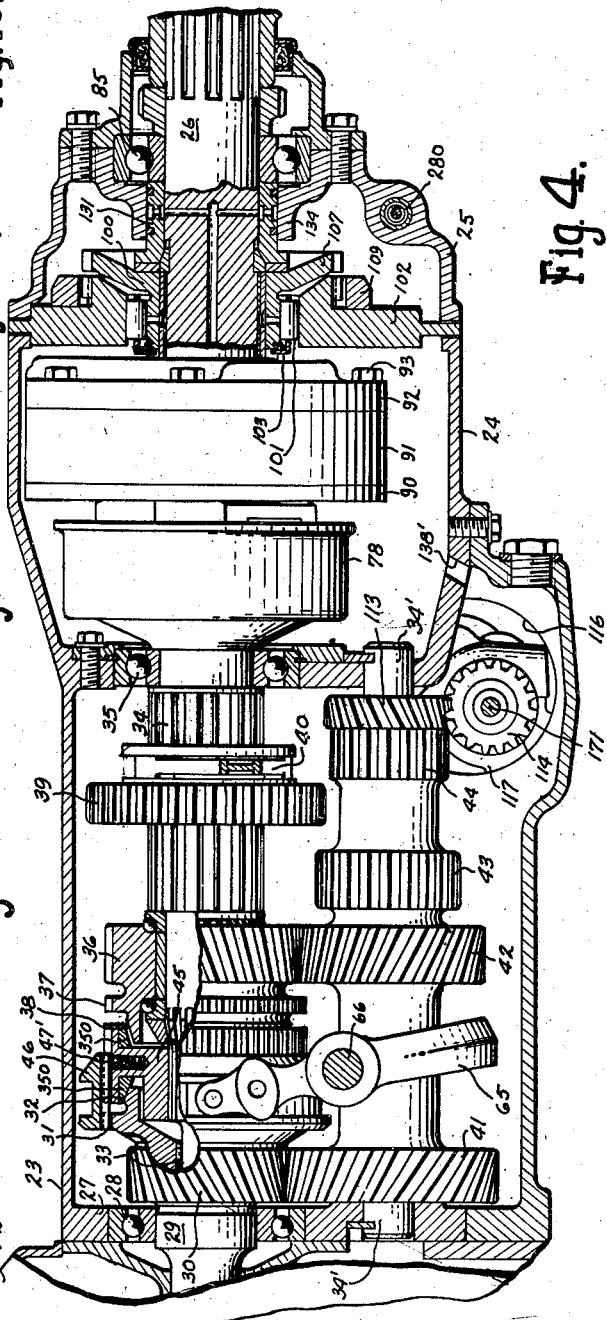
INVENTOR.
Jesse G. Vincent
BY Sibbetto & Hart
ATTORNEYS Jan. 25, 1944.   J. G. VINCENT   2,339,967
MOTOR VEHICLE
Filed Aug. 26, 1939   7 Sheets-Sheet 4
Fig. 5.
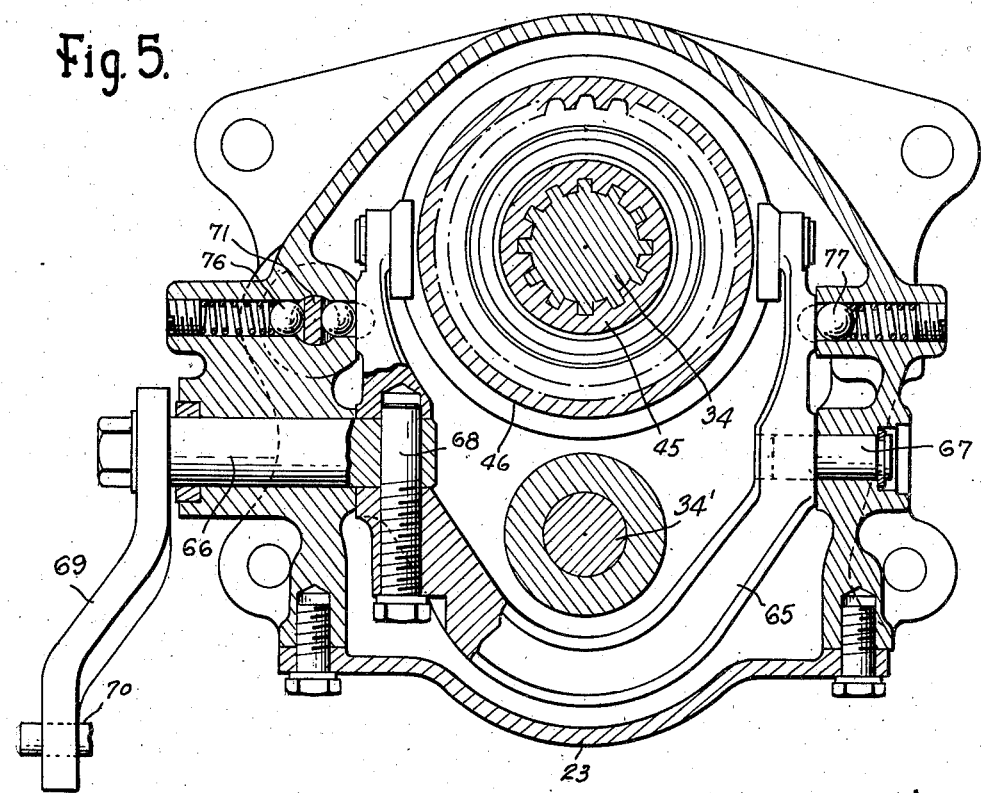
Fig. 7.
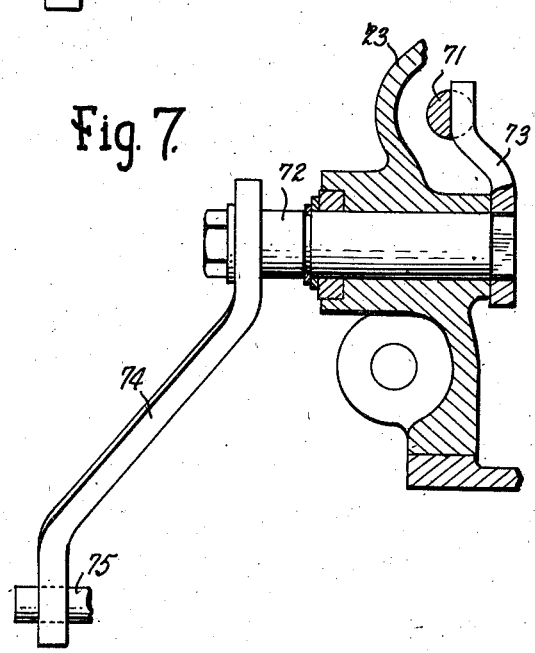
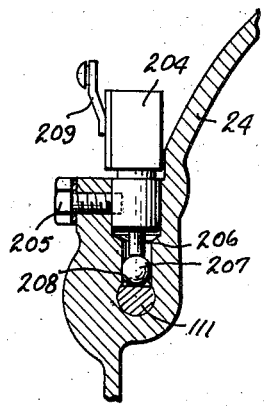
Fig. 12.
INVENTOR.
Jesse G. Vincent
BY Tibbetts & Hart
ATTORNEYS Jan. 25, 1944.    J. G. VINCENT    2,339,967
MOTOR VEHICLE
Filed Aug. 26, 1939    7 Sheets-Sheet 5
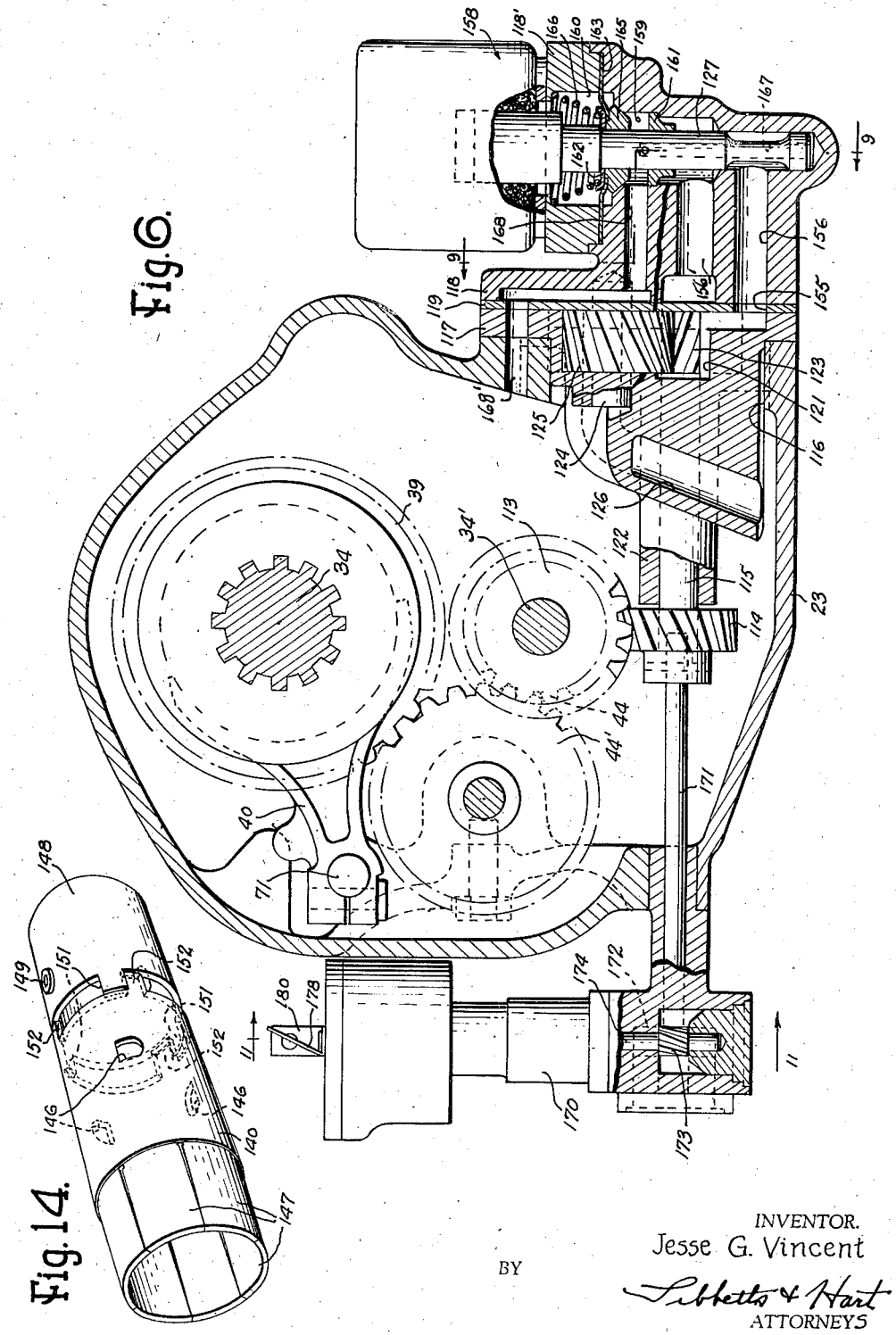
INVENTOR.
Jesse G. Vincent
BY
Tibbetts & Hart
ATTORNEYS

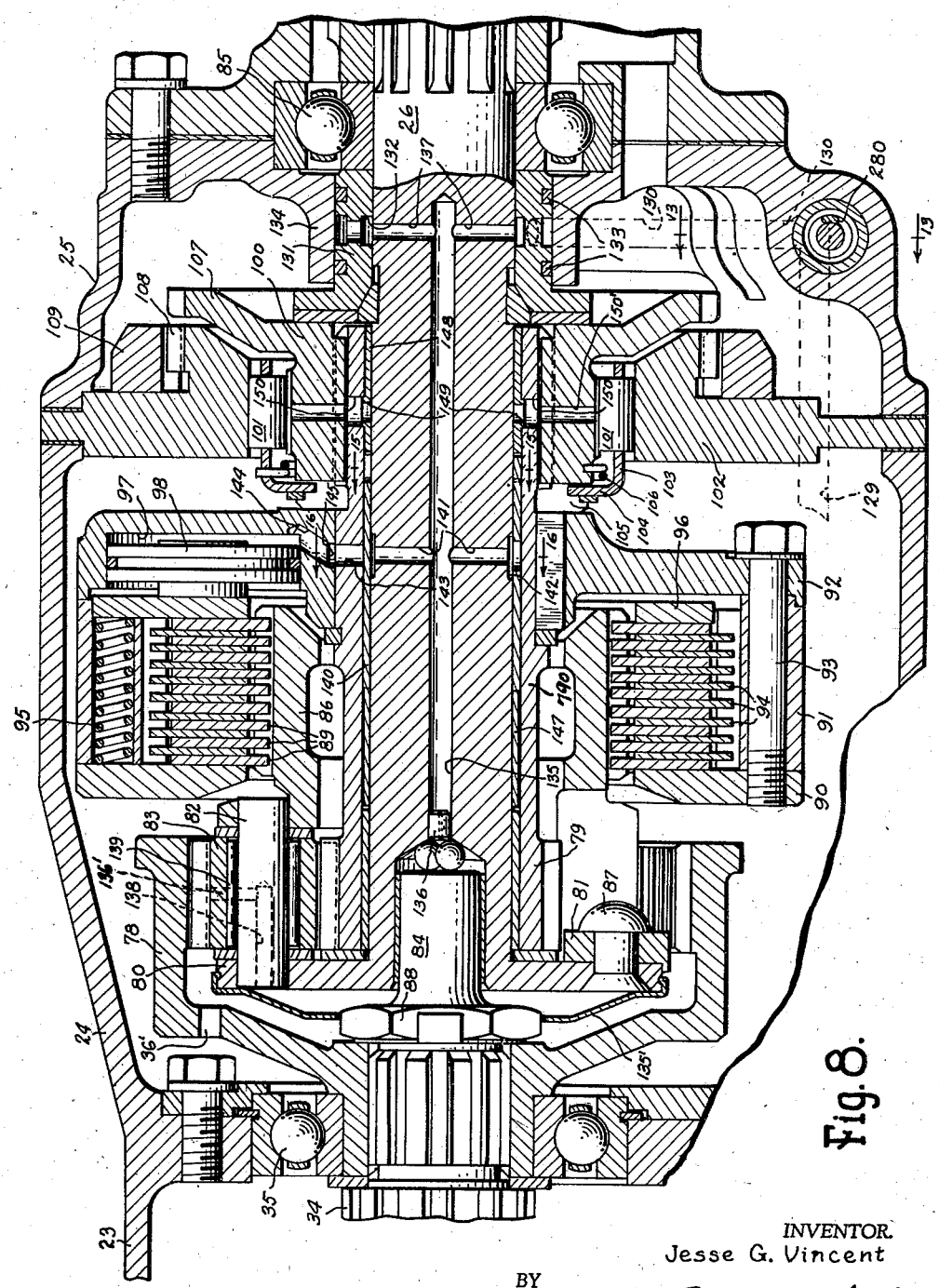

Jan. 25, 1944.   J. G. VINCENT   2,339,967
MOTOR VEHICLE
Filed Aug. 26, 1939   7 Sheets-Sheet 7
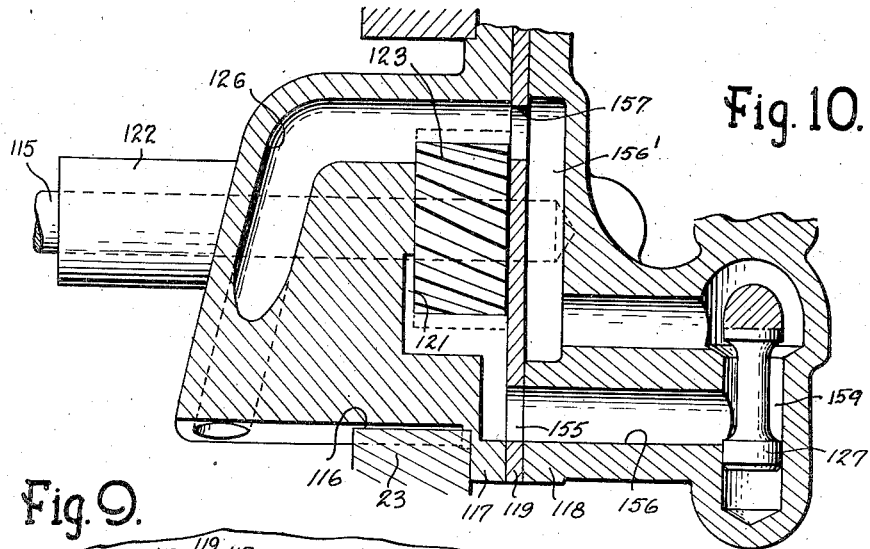
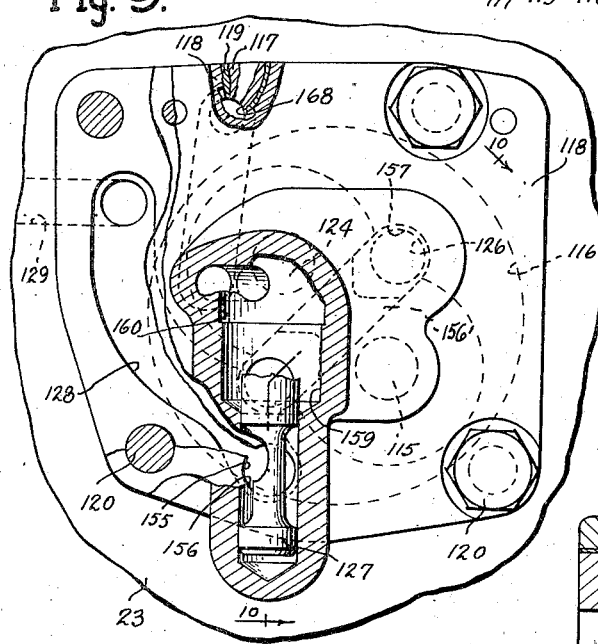
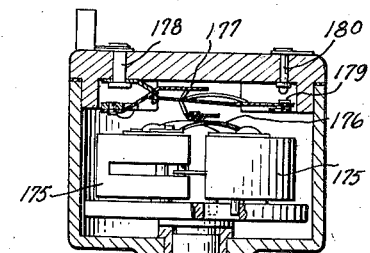
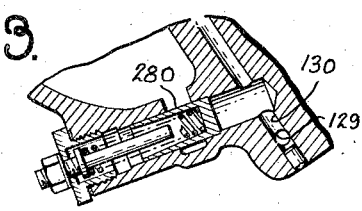
INVENTOR.
Jesse G. Vincent
BY
Sibbetts & Hart
ATTORNEYS Patented Jan. 25, 1944

2,339,967

UNITED STATES PATENT OFFICE 2,339,967

MOTOR VEHICLE

Jesse G. Vincent, Grosse Pointe, Mich., assignor to Packard Motor Car Company, Detroit, Mich., a corporation of Michigan Application August 26, 1939, Serial No. 292,122

14 Claims. (Cl. 74—472)

This invention relates to motor vehicle power transmitting mechanism of the type in which the drive from change speed gearing can be modified.

An object of the invention is to provide a motor vehicle with a power transmitting mechanism that can be operated in a cruising ratio except for limited times when more power is required than can be obtained through such ratio.

Another object of the invention is to provide a fluid actuated clutch for planetary gearing that is under the control of torque to delay engagement until the driving and driven members are synchronized.

Another object of the invention is to utilize a fluid system for controlling drive modifying mechanism and for positively lubricating the mechanism bearings.

Another object of the invention is to provide an electro-magnetic system for actuating a valve in a fluid controlled speed modifying mechanism having a one-way brake that is under the control of the reverse shift rail in change speed gearing to establish a modified drive whenever the change speed gearing is in reverse drive relation.

Another object of the invention is to provide a change speed gearing with drive modifying mechanism that can be controlled either by manually operable mechanism or by speed controlled mechanism.

Still another object of the invention is to provide a selective multiple speed gearing with modifying mechanism that can be made effective in any one of the selective relations.

A further object of the invention is to provide change speed gearing drive modifying mechanism that, while in operative relation, will allow the gearing to be changed into any one of its driving ratios without modifying the drive therefrom.

Other objects of the invention will appear from the following description taken in connection with the drawings, which form a part of this specification, and in which:

Fig. 1 is a fragmentary elevational view of a motor vehicle transmission mechanism incorporating the invention with part of the control mechanism shown diagrammatically;

Fig. 2 is a sectional view of the steering column shift mechanism for the transmission taken on line 2—2 of Fig. 1;

Fig. 3 is a plan view of the transmission partly broken away to better illustrate some of the controls;

Fig. 4 is a sectional view of the transmission taken on line 4—4 of Fig. 3;

Fig. 5 is a sectional view transversely through the transmission taken on line 5—5 of Fig. 1;

Fig. 6 is a sectional view of the transmission taken on line 6—6 of Fig. 1;

Fig. 7 is a sectional view of the transmission taken on line 7—7 of Fig. 1;

Fig. 8 is an enlarged longitudinal sectional view of the drive modifying mechanism shown in Fig. 4;

Fig. 9 is a sectional view of the fluid valve control mechanism, taken on line 9—9 of Fig 6;

Fig. 10 is a sectional view taken transversely of the transmission on line 10—10 of Fig. 9;

Fig. 11 is a sectional view of governor control mechanism taken on line 11—11 of Fig. 6;

Fig. 12 is a sectional view of control mechanism taken on line 12—12 of Fig. 1;

Fig. 13 is a sectional view of the pressure relief valve taken on the line 13—13 of Fig. 8;

Fig. 14 is a perspective view of the fluid control sleeves in assembled relationship;

Fig. 15 is a transverse sectional view of the fluid control taken on line 15—15 of Fig. 8;

Fig. 15A is a view similar to Fig. 15 with some of the parts in a different relation;

Fig. 16 is a sectional view taken on line 16—16 of Fig. 8;

Fig. 16A is a view similar to Fig. 16 with some of the parts in a different relation.

The power transmitting mechanism herein described is designed for use where a plurality of driving speeds are desired under varying conditions, and it is particularly adapted for use in motor vehicles. The power transmitting mechanism is shown as arranged beneath the floor board 20 and toe board 21 of a vehicle, see Fig. 4, in a conventional manner. The casing structure carrying the power transmitting mechanism comprises generally bolted-together sections 22, 23, 24 and 25. Section 22 houses the conventional engine flywheel and clutch, not shown, section 23 houses conventional shiftable change speed gearing, section 24 houses mechanism for modifying the drive from the change speed gearing and section 25 houses lock-out mechanism and part of the driven shaft or tail shaft 26.

The forward wall 27 of casing section 23 carries a ball bearing 28 in which is mounted the enlarged rear end of the driving shaft 29, which may be driven from the engine, not shown, through conventional clutch mechanism. Fixed on the end of shaft 29 in the casing section 23 is a gear 30 and, beyond such gear, the shaft is formed with clutch teeth 31 and with a cone friction clutch surface 32. This end of shaft 29 is hollow and carries a roller bearing 33 that receives the forward end of drive shaft 34, such shaft extending through the rear wall of casing 23 where it is supported by ball bearing 35. A gear 36 is loosely mounted on shaft 34 and is formed with clutch teeth 37 and a friction cone clutch surface 38. A gear 39 is splined on the shaft 34 at the rear of gear 36 and is axially shiftable through means of a yoke 40. Journaled on lay shaft 34' is a spool having gears 41, 42, 43 and 44 formed thereon. Gear 41 is in constant mesh with gear 30 on the driving shaft, gear 42 is in constant mesh with the loosely mounted gear 36, and the clutch 39 is shiftable to mesh with gear 43 or with a reverse idler 44' that is in constant mesh with gear 44.

Between gears 30 and 36 is arranged a shiftable clutch structure comprised of a hub section 45 slidably splined on the drive shaft 34 and a ring section 46 having internal teeth slidably engaged with peripheral teeth on the hub section. The hub section is provided with friction clutch cones 350 arranged to be engaged with the friction clutch cones 32 and 38 and the teeth of the ring section 46 are arranged to be engaged with either the clutch teeth 31 or 37. A spring pressed ball 47' in the hub section is engageable with a detent in the ring section and holds the sections together during the first part of the shifting of the clutch structure from neutral until after the selected cone clutch has been engaged thus synchronizing the shaft 34 with the clutch teeth to be engaged. Continued pressure against the clutch structure will release the ring section from the ball so that it will be moved to engage the selected tooth clutch. When the clutch structure engages the teeth 31, the drive will be from the driving shaft, through the clutch structure to the drive shaft and thus the shafts will rotate at the same speed. When the clutch ring section engages clutch 37 then the drive will be from the driving shaft, through gears 30 and 41, the spool, gears 42 and 36 and the clutch structure to the drive shaft, such drive being second speed forward. Engagement of gear 39 with gear 43 will provide first speed forward drive and the power flow will be from the driving shaft through gears 30 and 41 to the spool and gear 43 and gear 39 to the drive shaft. Engagement of the gear 39 with idler pinion 44' will provide reverse drive and the drive will be to the spool, just as in first speed drive, and will be transmitted therefrom through gears 44, 44' and gear 39 to the drive shaft.

The drive selection clutches are arranged to be shifted by mechanism under control of the vehicle driver and operable from a point adjacent the steering wheel 48, see Fig. 1. The steering hand wheel is arranged at the top of the usual post 49 and carried by the post, in general parallel relation therewith, is a rotatably mounted sleeve 50 having a hollow bracket 51 at its upper end in which a handle 52 is pivoted. The handle extends through a slot in the sleeve and engages in a recess in a rod 53 carried in the sleeve. A pair of actuator arms 54 and 55 are rotatably mounted on the lower end of the sleeve and are selectively engageable by a clutch 56 slidably splined on the sleeve and fixed to the lower end of rod 53 by a pin 57 that extends through a slot in the sleeve to allow limited movement axially of the sleeve. In the sleeve is a coil spring 58 pressing against the rod 53 to normally hold it in uppermost position such that the clutch 56 will drivingly engage arm 54 as shown in Fig. 2.

Arm 54 is connected to control the clutch ring 46 while arm 55 is connected to control gear 39. Bell cranks 59 and 60 are pivotally mounted on a shaft 61 carried by bracket 62 suitably fixed to the vehicle chassis. Link 63 connects arm 55 with bell crank 60 and link 64 connects arm 54 with bell crank 59. A yoke 65 engages clutch ring 46 and rocks on pins 66 and 67 mounted in opposite sides of casing 23, the yoke being fixed to rotatable pin 66 by bolt 68, see Fig. 5. An arm 69 is fixed to pin 66 and link 70 connects this arm with bell crank 59. Shift rail 71 is slidably mounted in casing 23 and carries yoke 40 engaging gear 39. Shaft 72 extends through a wall of casing 23 and carries an actuator arm 73 engaging the rail at its inner end and has an arm 74 fixed to its outer end that is connected by link 75 with bell crank 60. The rail is retained in clutch control positions in the usual manner by spring pressed detents 76. Similar detents 77 engage the clutch yoke 65.

The handle 52 is swung upwardly for operating rod 53 to engage clutch 56 with arm 55, the grip end of the handle being normally held in its downwardly pivoted position by spring 58 to engage clutch 56 with arm 54. Thus the pivotal position of the handle selects the change speed gearing clutch to be actuated. After such selection, the handle is moved laterally to rotate sleeve 50 and the engaged arm. With the handle in downward pivotal position, shown in Fig. 2, the clutch 56 is engaged with arm 54 and lateral swinging of the handle will actuate the mechanism connected to the clutch section 46 to engage it either with teeth 31 on shaft end 29 to provide direct drive, see Fig. 4, or with the clutch teeth 37 on gear 36 to provide second speed forward drive depending upon the direction of lateral movement of the handle. With the grip end of the handle in upward pivotal position the arm 55 is engaged by clutch 56 and lateral handle movement will shift rod 71 forward to engage gear 39 with gear 43 to provide first speed forward or rearward to engage gear 39 with idler gear 44' to provide reverse drive, depending of course on the direction of the lateral movement.

In casing 24 is arranged planetary gearing for drivingly connecting the change speed gearing drive shaft 34 with the tail or driven shaft 26 to provide a direct or modified drive. Such gearing comprises a ring gear 78 splined on shaft 34, a sun gear 79 loosely mounted on the driven shaft, planet gears 83 meshing with the ring gear and the sun gear and planet gear shafts 82 mounted on a carrier structure consisting of a flange 80 at the forward end of the tail shaft and the forward end 81 of a clutch hub 86, such carrier members being fixed together by rivets 87. The forward end of the tail shaft telescopes and is piloted on the rear end 84 of shaft 34 and the tail shaft is also carried by a ball bearing 85 in the rear wall of casing 25. A nut 88 screws upon the shaft 34 to prevent axial displacement of the ring gear 78.

The planetary gearing drivingly connects the shafts 34 and 26. When the sun gear is locked to the planet gear carrier the drive from the drive shaft to the driven shaft is direct and when the sun gear is retarded or stopped in its rotation then the drive is modified. In the present embodiment of the invention the gearing is such that underdrive is obtained when the sun gear is stopped or retarded, in other words shaft 26 is driven at a speed of rotation less than during direct drive but greater than second speed drive.

The planetary gearing is locked together by clutch mechanism of the friction disk type and the hub 86 has peripheral axially extending slots into which plates 89 extend. The other portion of the clutch comprises a housing made up of three sections 90, 91 and 92 secured together by bolts 93, section 91 having axially extending slots into which plates 94 extend and section 92 being splined to sleeve 790 of gear 79. The plates 89 and 94 are axially movable and are normally disengaged by coil springs 95 that hold the pressure ring 96 in rearmost position. The clutch casing section 92 is formed with a plurality of recesses 97 in which pistons 98 are slidably mounted and such pistons are arranged to be moved forwardly by a fluid pressure system to move the pressure ring forwardly to hold the clutch plates in engaged relation.

The drive between shafts 34 and 26 can also be controlled by one-way brake mechanism. Splined on the rear end of the sun gear sleeve 790 is a hub 100 having peripheral angular faces on which rollers 101 are mounted and surrounding the rollers is a ring 102 bolted between transmission casing sections 24 and 25. The rollers ride on the hub faces and fractionally wedge between ring 102 and the hub when torque is applied to the sun gear sleeve by the drive shaft. However, the rollers are free when torque is applied to the sun gear sleeve by the driven shaft. The rollers 101 are carried by a cage 103 having radial fingers 104 extending into slots 105 in the brake hub 100 and spring means 106 engages the cage and the clutch hub urging the rollers into braking position.

When the change speed gearing is shifted for reverse drive, it is of course necessary that the sun gear sleeve be locked positively when released by the one-way brake. As a means for accomplishing this, the hub 100 fixed to the sun gear sleeve is formed with a flange 107 having peripheral teeth that align with teeth 108 on a flange forming a part of ring 102. A ring clutch member 109 has teeth constantly meshing with teeth 108 and is shiftable to engage the teeth on flange 107 when it is desired to lock the hub 100 with the ring 102. The clutch ring is normally held out of engagement by spring 110, see Fig. 3. Extending through casing 24 is an actuator rod 111 having a shouldered rear end engaging the clutch ring and a forward end in the path of shift rail 71 when moved to establish reverse drive. Thus when rail 71 is shifted to establish reverse drive it pushes rod 111 rearwardly to engage the clutch ring 109 with the teeth on the hub flange 107 so that the sun gear will be held stationary and establish a positive reverse underdrive through the planetary gearing to tail shaft 26. When the rail 71 is shifted out of reverse drive position, the spring 110 will move the clutch ring 109 out of engagement with the flange 107.

As previously stated, the planetary gearing disk clutch is actuated by a fluid pressure system and preferably utilizes a portion of the lubricating oil in the change speed gearing casing. A drive gear 113 is fixed to rotate with the gear spool mounted on shaft 34' and this drive gear meshes with a gear 114 fixed on shaft 115 extending in a transverse direction in casing 23, see Figs. 4 and 6. One side of the casing 23 is formed with an opening 116 into which a pump casing fits, such casing comprising two cast sections 117 and 118 and an intermediate plate 119. These pump sections have parallel flanges that are secured to the wall of casing 23 by bolts 120. One end of section 117 is recessed and with the adjacent portion of plate 119 forms a pump chamber 121. Shaft 115 is carried by a sleeve portion 122 of casing section 117 and extends into the chamber where a pump gear 123 is fixed thereto. Shaft 124 extends across the chamber and carries a pump gear 125 that meshes with pump gear 123. The casing section 117 lies adjacent the bottom of casing 23 and has an inlet passage 126 therein through which oil can be drawn by the pump from the bottom of casing 23 into the pump chamber. Oil drawn through the inlet passage into the upper portion of the chamber is carried around the chamber by the pump teeth into the lower portion of the chamber wher it is moved to the clutch pistons or recirculated in the pump structure depending upon the position of a primary control valve 127.

The lower portion of the pump chamber has an outlet passage 128 in casing section 117 that communicates with passage 129 in casing 24, see Figs. 3, 8 and 9, and such last mentioned passage continues on longitudinally through ring 102 and casing section 25 where it joins a radially extending passage 130, that leads through the spacer bearing 131 to an interior annular recess 132 therein. Sealing rings 133 are carried by the bearing, one on each side of the annular recess, and bear against the forwardly extending flange 134 of the rear wall of casing 25. An oil feeding passage 135 is formed centrally in the forward end of the tail shaft and at its forward end receives a plug 136. Radial ports 137 connect the passage 135 with the annular recess 132 and a small opening is formed in the plug 136 so that oil can flow through the front recess in the tail shaft. An oil guide 135' is spun around the carrier flange 80 to guide oil flowing from the front end of the tail shaft into feeding passages 138 in the planet gear shafts from which the oil flows to the roller bearings 139 for the planet gears. The overflow of oil from the bearings will keep the meshing gears of the planetary gearing properly lubricated through passages 136' in the planet gears and excess oil in the planetary gearing can pass through opening 36' to the bottom of casing 24 from which it flows back into casing 23 through an opening 133', see Fig. 4.

Flow of oil from passage 135 to the recesses 97 of the clutch actuator pistons, when allowed by the primary control valve 127, is controlled by a secondary control valve in the form of a sleeve 140 that is positioned intermediate the tail shaft and the sun gear sleeve. Passages 141 extend radially from the passage 135 in the tail shaft and terminate in a peripheral annular groove 142. Passages 143 extend radially through the sun gear sleeve in the same vertical plane with passages 141. Leading from the recesses 97 in casing section 92 are passages 144 that are open to an annular grove 145 with which passages 143 register. The sleeve 140 has ports 146 arranged to register with passages 143 and the annular groove 142 under certain circumstances. As this sleeve 140 blocks or allows oil flow to the passages 143 when the ports 146 do not register or register with ports 141, the sleeve may be termed a valve. The forward end of the sleeve valve 140 is slit to form spring fingers 147 that frictionally grip the tail shaft and rotate therewith but the extent of such sleeve rotation is limited by an anchor sleeve 148. This anchor sleeve lies intermediate the tail shaft and the sun gear sleeve and has apertured flanges 149 that project into radial passages 150 in the sun gear sleeve, such radial passage serving also to feed oil to radial passages 150' in the hub 100 to lubricate rollers 101. The forward end of sleeve 148 has projecting fingers 151 and the rear end of sleeve 140 is formed with fingers 152. The fingers of the two sleeves lie side by side and are spaced circumferentially to allow a limited relative rotation of the sleeves, one limit of relative rotation aligns the ports 146 in sleeve 140 with passages 143 while the other limit of relative movement of the sleeves carries the ports 146 out of registration with passages 143 to block off oil flow to the clutch pistons.

The sleeve valve 140 is frictionally held by the spring fingers 147 to rotate with the tail shaft when the anchor sleeve 148 permits. Thus when torque is applied to the tail shaft from the engine through the planetary gearing the sleeve valve will be carried to one extreme position of its rotation where its fingers engage the fingers of the fixed anchor sleeve and in such position the ports 146 will be out of registration with passages 141, thus blocking oil flow to the disk clutch actuator pistons as shown in Figs. 15 and 16. When the tail shaft overruns the drive through planetary gearing, as it will upon torque reversal, the sleeve valve will be rotated to its other extreme position of rotation as allowed by the fingers 151 thus registering the ports 146 with passages 141 and 143 allowing oil flow to the disk clutch actuator pistons, as shown in Figs. 15A and 16A. Thus the pressure plate 96 will be moved and held by fluid pressure to engage the disk clutch providing direct drive from the shaft 34 to shaft 26 through the planetary gearing.

Because of the requirement of torque reversal to shift the sleeve valve to allow oil flow to the disk clutch, the tail shaft and the sun gear shaft with which the clutch housing is fixed will be rotating at substantially the same speed when the disk clutch is moved into engagement. Thus the speed of the elements to be clutched is synchronized by this secondary control before the clutch connection is made even though the oil pressure system has been previously opened for the operation by the primary control valve 127. Because of this arrangement a smooth shift operation is obtained and the life of the clutch mechanism and associated parts is prolonged.

The pump casing plate 119 is formed with a port 155 that is open to the pump chamber passage 121 and communicating with this port is a passage 156 formed in the pump casing section 118. This passage is adapted to be opened or closed to another passage 156' in the section 118 that communicates with another port 157 in the casing plate 119 that is open to the inlet side of the pump chamber. The passage and ports just referred to provide an oil recirculation path or by-pass when the position of the control valve 127 permits. This valve is mounted to reciprocate in a chamber 159 through which oil can flow from passages 156 to 156'. The valve, in its lowermost position, will shut off oil flow from passage 156 but when raised will permit such flow. Thus when oil pressure required to engage the disk clutch is desired, the valve 127 must close passage 156.

The valve 127 is preferably under the control of an electric system and is directly actuated by a solenoid 158. The solenoid is carried on a mounting 118' fixed on the pump casing section 118 and has an opening 160 therein aligning with the valve chamber 159 in casing section 118. In the valve chamber is fixed a guide ring 161 through which the valve extends and abutting a shoulder on the valve is a spring retainer 162. A seal 163 is clamped between the mounting and the pump casing by bolts 164, see Fig. 3, and the seal is clamped against the retainer by a ring 165 pressed on the valve. This ring also serves as a stop for the valve to limit downward movement occasioned by the pressure of the coil spring 166 against the retainer. The valve stem is arranged to serve as an armature in an electro-magnetic control system and is normally in the lowermost position where its closes passage 156, see Fig. 6, due to the action of spring 166 and is raised to open passage 156, see Fig. 10, when the solenoid is energized.

The valve 127 is drilled to form a relief passage 167 leading from its lower end to a point between guide ring 161 and seal 163. Oil and air in the valve chamber can thus travel through the passage from the bottom of the valve recess to a passage 168 in the pump casing that empties into casing 23 through passage 168' extending through casing sections 119, 117 and 23.

A governor mechanism is provided as one means of controlling the electric system in which the solenoid is arranged. A governor and switch casing 170 is fixed to the side of casing 23 opposite the pump, and drive shaft 171 extends into the governor casing and has a driving connection with pump shaft 115. On the shaft 171 is fixed a gear 172 that meshes with gear 173 fixed on a governor spindle 174. At the upper end of the spindle is pivotally mounted a pair of centrifugally actuated weights 175 to which is fixed a flexible strip 176 that serves as an actuator for an over-center type of switch 177 having a fixed connection with terminal 178 and a movable contact 179 arranged to be engaged with or disengaged from terminal 180. This governor is adjusted to close the switch below some predetermined vehicle speed, such as eighteen miles per hour when the change speed gearing is engaged for direct drive, and to allow the contact 179 to become disengaged from terminal 180 above such speed.

Two manually operable devices are provided for controlling the electric system to energize the solenoid. One of these devices is governed by the position of the accelerator pedal 181 that is pivoted on the toe board 21 at one end. The other end of the pedal has a rod 182 connected thereto and the rod is connected to bell crank 183 fixed on shaft 184 that is rotated to actuate the throttle regulating mechanism. One arm of the bell crank is arranged to actuate a switch, indicated generally at 185, controlling the circuit to the valve solenoid. This switch is of a conventional over-center type and is open until closed by the bell crank and after being closed it will remain so during a considerable travel of the accelerator pedal. The range of the pedal travel between idling and wide open throttle is shown in dotted lines in Fig. 1 and the pedal must be moved beyond the position required to fully open the throttle in order for the bell crank to snap the switceh 185 closed. After the switch has been closed the pedal can move partly in the dotted line range without the switch opening and thus a varied acceleration can be had while the switch is closed.

The other manual control of the electric system is a conventional switch device 186 on the vehicle dash 187 having a knob 188 for making or breaking a circuit between terminals 189 and 190. Whenever this device is open, the solenoid circuit will be open and direct drive through the planetary gearing will be established.

The electric control system is shown diagrammatically in Fig. 1 and the vehicle battery indicated at 191 is of a conventional type and grounded to the vehicle frame. A conductor line 192 leads from the battery to ignition switch 193 and the ignition switch is connected with terminal 189 of switch 186 by conductor line 194. One terminal of switch 185 is connected by conductor 195 with a terminal 178 of the governor switch and leading to this line from terminal 190 of the dash switch is a conductor line 196. The other terminal 180 of the governor switch is connected with a relay 197 by conductor line 198 and a terminal of switch 185 is connected with conductor line 199. The relay is connected with the power line 192 by conductor line 200 and the relay has a ground line 201. The solenoid is grounded as indicated at 202 and is conected to the relay by line 203.

A switch 204 is provided for establishing and maintaining the circuit to the solenoid to provide underdrive when the change speed gearing is shifted into reverse drive in order to prevent application of the disk clutch while the sun gear is locked to the casing by the clutch 107. This switch is fixed on casing 24 by a bolt 205, see Fig. 21, and has a contact actuating stem 206 that is engaged by a ball 207 bearing against the clutch rod 111. The rod is formed with a slot 208 in which the ball 207 rides to release the stem 206 so that the switch 204 will automatically open except when the shift rail is in reverse drive position and when the ball rides out of the slot the rail closes the switch to energize the solenoid and by-pass the fluid in the pump casing. The switch has terminals 209 and 210, terminal 209 being connected with conductor line 195 by conductor line 300 and terminal 210 being connected with conductor line 198 by conductor line 301. The electric system will thus be energized while the reverse drive is maintained so that the disk clutch cannot be engaged.

As previously stated, engagement of the disk clutch by fluid pressure will lock the sun gear with the carrier thus causing the planetary gearing to be locked and thereby positively connecting the shafts 34 and 26 to provide a direct drive from one to the other. Thus when valve 127 is pressed in its lowest position by the spring 166, which occurs only when the solenoid is not energized, fluid flow through passage 156 will be blocked and all the fluid moved by the pump will flow through the passages into the tail shaft. When the sleeve valve 140 permits, the fluid will pass into the clutch chambers 97 and move the pistons 98 to engage clutch disks 89 and 94. When the solenoid is energized, the valve 127 will be lifted to establish communication between passages 156 and 156' so that a portion of the oil moved by the pump will be circulated in the pump casing and the balance of the oil flowing to the tail shaft will exert insufficient pressure against the pistons 98 to overcome springs 95 and engage the disk clutch. Thus underdrive and direct drive through the planetary gearing is obtained.

As the switch 204 is automatically opened when the clutch rod 111 is in position fixing the sun gear to the main casing while the change speed gearing is set in reverse drive, the circuit to the solenoid is broken so that valve 127 will be closed.

When the valve 127 is open to allow oil flow through passage 156 in the pump casing, some of the oil will be moved into passages 168 and 135 even though insufficient to actuate the clutch. Thus the pump will at all times maintain oil under pressure in passage 135 and passage thereof to bearing 85 through passages 131 is insured. In order that too much oil will not be moved to the system conducting oil to the clutch and bearings, a relief valve 280, of conventional form, see Fig. 13, is provided at the junction of passages 129 and 130, such relief valve being arranged to be opened by pressure above a predetermined amount in passage 130.

The change speed gearing can be controlled by shift mechanism to provide three forward driving speeds and reverse drive to the drive shaft 34, as previously related. When the planetary gearing is locked by the disk clutch being engaged, the drive form shaft 34 to shaft 26 will be direct, but when the disk clutch is released and the driving torque is from the drive shaft then the sun gear is fixed to the casing ring 102 by the brake rollers 101 and the drive from shaft 34 to shaft 26 is modified through the planetary gearing, in this instance the drive being reduced between direct and second speed. When the driving torque is from the tail shaft, then the sun gear sleeve is freed by the brake rollers so that there is no drive to the vehicle wheels.

The position of the disk clutch is obtained by the fluid pressure system in which there is a valve under the control of a solenoid in an electric system that can be controlled by a governor by the driver. In order to eliminate free wheeling or operation of the fluid system when in reverse drive, the reverse shift rod is arranged to move clutch 109 to lock the sun gear sleeve to the casing and to close the switch 204. The circuit to the solenoid can be opened or closed by operation of switches 186, 193 or 204. When one of these switches is open, the solenoid is inactive and the pressure control valve 127 is closed by spring 166 so that the clutch will be fluid pressure closed to provide direct drive through the planetary gearing. When the solenoid circuit is not broken by opening one of these switches then the governor operated switch or the foot operated switch will control the solenoid circuit. When the vehicle is traveling below a predetermined speed the governor switch is closed, thus closing the solenoid circuit and opening the oil by-pass so that the disk clutch will be disengaged to provide modified or underdrive through the planetary gearing. When the vehicle is traveling above the predetermined speed then the governor operated switch will be opened, breaking the solenoid circuit so that valve 127 will close passage 156 to thus engage the disk clutch and provide direct drive through the planetary gearing.

The accelerator switch is provided to take control away from the governor controlled switch when the vehicle is traveling in direct drive. This accelerator switch is usually utilized to provide underdrive when it is desired to pass another vehicle on the road at which time acceleration is necessary. When the accelerator pedal is pressed down beyond wide open throttle position, it will close switch 185 and energize the solenoid circuit so that the valve 127 will open and by-pass fluid to thus release the disk clutch so that the brake will fix the sun gear sleeve to the casing ring 102 and thus modify the drive through the planetary gearing. As soon as the pedal is released to substantially engine idling position, then the switch 185 will open and the governor operated switch will resume its normal functioning to establish direct drive through the planetary gearing.

In shifting the clutch from underdrive to direct drive by opening switch 185 or the governor controlled switch, the solenoid will be deenergized and valve 127 will close so that there will be full fluid flow to passage 135 but such fluid is blocked off by valve sleeve 140 until the sun gear sleeve and the tail or driven shaft have synchronized and a slight reversal of torque has taken place. This synchronizing can be assisted by the operator lifting his foot on the accelerator pedal to reduce the engine fuel supply. Because of the sleeve valve the disk clutch engagement, to provide direct drive, will be delayed. Due to this delay, it is possible for the driver to shift gears before the direct drive is established because by pressing down on the accelerator pedal after each shift the torque reversal will not occur. Thus the driver can shift the change speed gear.

What is claimed is:

1. The combination with a driving shaft and a driven shaft, of a planetary gearing for driving said driven shaft at the same or at different speed than that of the driving shaft, a clutch structure for establishing the driving relations between said shafts through said gearing, means operable to engage said clutch, fluid pressure means for actuating said clutch engaging means, and valve means for preventing application of the fluid pressure means to actuate said clutch engaging means until the speed of the clutch elements is synchronized.

2. The combination with a driving shaft and a driven shaft, of a planetary gearing drivingly connecting said shafts, a clutch associated with said gearing for modifying the drive transmitted to said driven shaft when engaged, means operable to engage said clutch, fluid pressure means for actuating said clutch engaging means, and means delaying fluid pressure actuation of said clutch engaging means until after the elements of said clutch have reached the same speed of rotation.

3. The combination with a driving shaft and a driven shaft, of a planetary gearing drivingly connecting said shafts, said gearing having a sun gear sleeve rotatably mounted on said driven shaft, a valve sleeve between said sun gear sleeve and said driven shaft frictionally engaging the driven shaft, a clutch having elements connected with different elements of said planetary gearing and engageable to hold one of the gearing elements to modify the drive to the driven shaft, means fixed to the sun gear sleeve limiting the rotation of said valve sleeve with said driven shaft, and a fluid pressure system leading through said driven shaft and said sun gear sleeve for engaging said clutch, said valve sleeve being shiftable to open the pressure system to the clutch when said driven shaft overruns the driving shaft.

4. In a vehicle power transmitting mechanism, a driving shaft, a driven shaft, planetary gearing connecting the shafts, a clutch controlling the planetary gearing, a fluid pressure system connected to actuate said clutch, a solenoid controlled primary valve in the fluid system, and a second valve in the fluid system actuated by said driven shaft.

5. In a vehicle power transmitting mechanism, a driving shaft, a driven shaft, planetary gearing including a sun gear sleeve drivingly connecting said shafts, a clutch operable to lock said gearing together to provide direct drive, an overrunning clutch operable to fix said sun gear sleeve to provide modified drive, a fluid pressure system for engaging said planetary locking clutch, a primary valve in the system controlling fluid flow, and a second valve in the system controlling fluid flow when said primary valve is open, said second valve being responsive to torque reversal of the driven shaft to open said system to said locking clutch.

6. In a vehicle power transmitting mechanism, a driving shaft, a driven shaft, planetary gearing including a sun gear sleeve drivingly connecting said shafts and telescoping the driven shaft, a normally released clutch operable to lock said sleeve with the driven shaft, an overrunning clutch for fixing said sleeve when said locking clutch is released, a fluid pressure system extending partly through said driven shaft and said sleeve for engaging said locking clutch, a primary flow control valve in said system, a flow control sleeve valve frictionally engaging said driven shaft between said primary valve and clutch, said sleeve valve being between the sun gear sleeve and the driven shaft and rotatable with said driven shaft, and means fixed to said sun gear sleeve for limiting the rotation of said sleeve valve with the driven shaft.

7. In a vehicle power transmitting mechanism, a casing structure, change speed gearing in one section of the casing having a driven shaft and a reverse gear shift rail, a second driven shaft in another portion of the casing, planetary gearing connecting said shafts, said planetary gearing including a sun gear sleeve mounted on the second driven shaft, a clutch operable to lock said planetary gearing to provide direct drive, an overrunning clutch having a race portion fixed to the sun gear sleeve and another race portion fixed to the casing, a positive clutch operable to lock the race portions of said overrunning clutch together, a spring normally disconnecting said positive clutch from locking relation with said race portions of said clutch, and rod means in the path of said reverse gear shift rail and operable thereby when in reverse gear drive position for shifting said positive clutch to lock the race portions of the overrunning clutch together.

8. In a motor vehicle power transmitting mechanism, change speed gearing including a reverse drive and a shift rail for establishing reverse drive, a driven shaft, planetary gearing connecting the change speed gearing with the driven shaft including a sun gear, clutch means for locking said planetary to provide direct drive, a fluid pressure system including a control valve for engaging said clutch, an overrunning means associated with the sun gear to form a one-way brake and to provide modified drive, a normally disengaged brake operable to fix the sun gear, means operated by the reverse shift lever and movable therewith to positively brake the normally disengaged brake, and hold the sun gear stationary, a controlled electric system including a solenoid for moving said fluid pressure system valve to relieve the pressure on the associated clutch when energized, and an switch in said electric system controlled by said reverse shift rail to maintain a closed circuit and energize the solenoid while said shift rail is in position establishing reverse drive.

9. In a motor vehicle power transmitting mechanism, a tail shaft having an axially extending oil passage in its forward end, planetary gearing including a sun gear sleeve around the forward end of said driven shaft, a clutch associated with said planetary gearing to lock or release the same, operating means for said clutch, radial passages in said sleeve and shaft through which oil can be moved to actuate said clutch operating means from the axial passage in said driven shaft, pump means for constantly moving oil through said axial passage while operating, a valve operable to control the volume of oil moving through said axial passage, and means for directing oil flowing from the forward end of the axial passage in the driven shaft to the planetary gearing.

10. In a motor vehicle power transmitting mechanism, a drive shaft, a tail shaft mounted on the rear end of said drive shaft and having an axially extending oil passage through its forward end, planetary gearing including a sun gear sleeve around the forward end of said driven shaft, a clutch associated with said planetary gearing to lock or release the same, a controlled oil pressure system leading to the passage in said tail shaft, means responsive to oil pressure in said tail shaft for controlling said clutch, and a valve controlling oil flow to said clutch control means, the oil being free to flow in said tail shaft and through the end opening to said drive shaft regardless of the position of said valve when the mechanism is operating.

11. In a motor vehicle power transmitting mechanism, a tail shaft having an axially extending oil passage therein, a constant flow controlled pressure system leading to the passage in said shaft and operable only when the mechanism is operating, planetary gearing including a sun gear sleeve drivingly connected to said tail shaft, a clutch for locking or releasing said planetary gearing, means responsive to high oil pressure in said shaft passage for engaging said clutch, means controlling oil flow between said shaft and said clutch engaging means, brake means operable to engage said sun gear sleeve, and means directing oil from the passage in said tail shaft to said brake means.

12. In a motor vehicle power transmitting mechanism, a drive shaft, a tail shaft having its forward end carried on the rear end of said drive shaft, a bearing for the rear end of the tail shaft, said tail shaft having an axial passage therein extending through the forward end thereof, a planetary gearing drivingly connecting said shafts, a fluid operable clutch means for locking said planetary gearing, a pressure oil system leading to the passage in said tail shaft and operable only when the mechanism is operating, means controlling fluid flow from the passage in said tail shaft to said clutch means, open passage means leading from said tail shaft passage to said rear tail shaft bearing, and means controlling oil flow to said clutch means.

13. In a motor vehicle power transmitting mechanism, a casing divided into two sections, one of said sections containing change speed gearing and the other section containing a driven shaft and drive modifying mechanism including a clutch, oil pasage means leading from the bottom of the section containing the change speed gearing and through a wall of the section containing the driven shaft to said clutch, a pump in said passage, a control valve in the passage means adjacent the delivery side of the pump regulating the volume of flow to the clutch, and a pressure relief valve in the passage means in the wall of the section containing the driven shaft between the clutch and the control valve.

14. In a motor vehicle power transmitting mechanism, a drive shaft, a driven shaft, planetary gearing drivingly connected with said shafts, a spring released clutch operable to lock said planetary gearing, a pump driven from the mechanism, a passage means leading to the clutch and through which fluid is moved by the pump, a by-pass means for the fluid passage leading from the delivery side to the intake side of the pump, and a valve operable to open or close the by-pass means, the oil pressure in said passage means being insufficient to engage the clutch when the by-pass means is open but sufficient to engage the clutch when the by-pass means is closed.

JESSE G. VINCENT.

CERTIFICATE OF CORRECTION.

Patent No. 2,339,967.

January 25, 1944.

JESSE G. VINCENT.

It is hereby certified that error appears in the printed specification of the above numbered patent requiring correction as follows: Page 3, second column, line 19, for "wher" read --where--; page 4, second column, line 12, after the word "limit" insert --its--; line 17, for "its" read --it--; line 71, for "switceh" read --switch--; page 5, first column, line 16, before "195" insert --line--; lines 33 and 34, for "Fig. 21" read --Fig. 12--; and second column, line 23, for "form" read --from--; page 6, second column, line 71, claim 8, for "an" before "switch" read --a--; page 7, second column, line 22, claim 13, for "pasage" read --passage--; and that the said Letters Patent should be read with this correction therein that the same may conform to the record of the case in the Patent Office.

Signed and sealed this 15th day of August, A. D. 1944.

Leslie Frazer

(Seal)

Acting Commissioner of Patents.